UNITED STATES PATENT OFFICE.

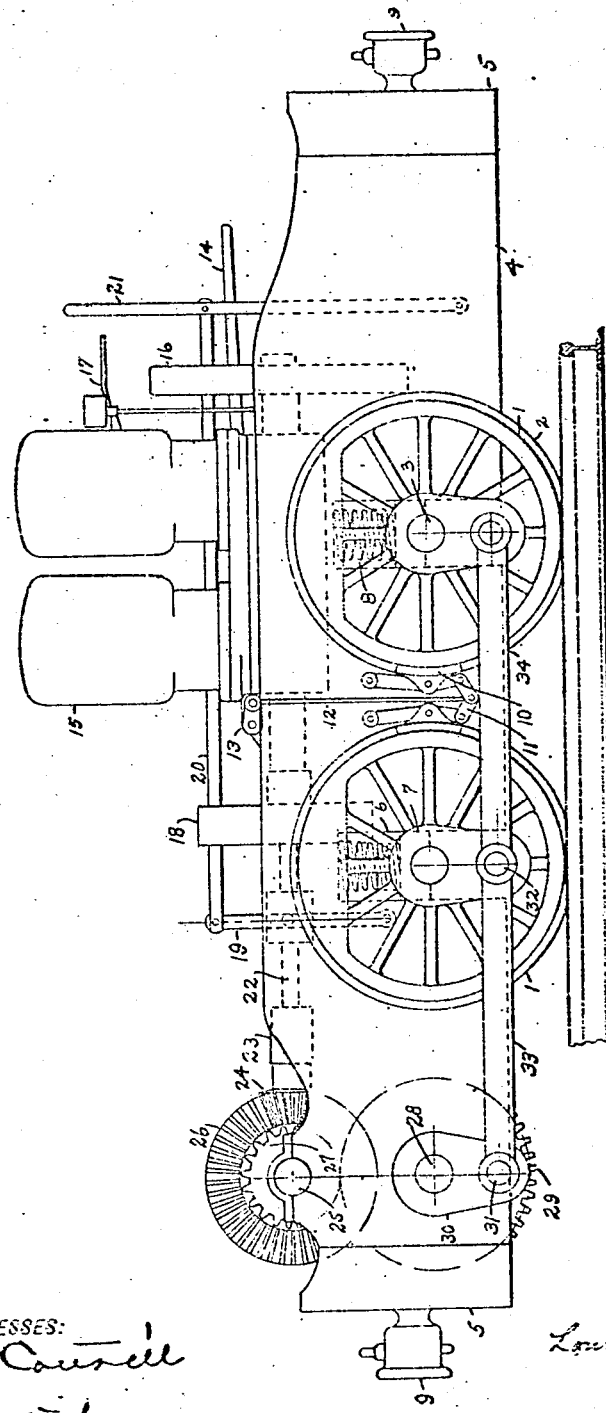

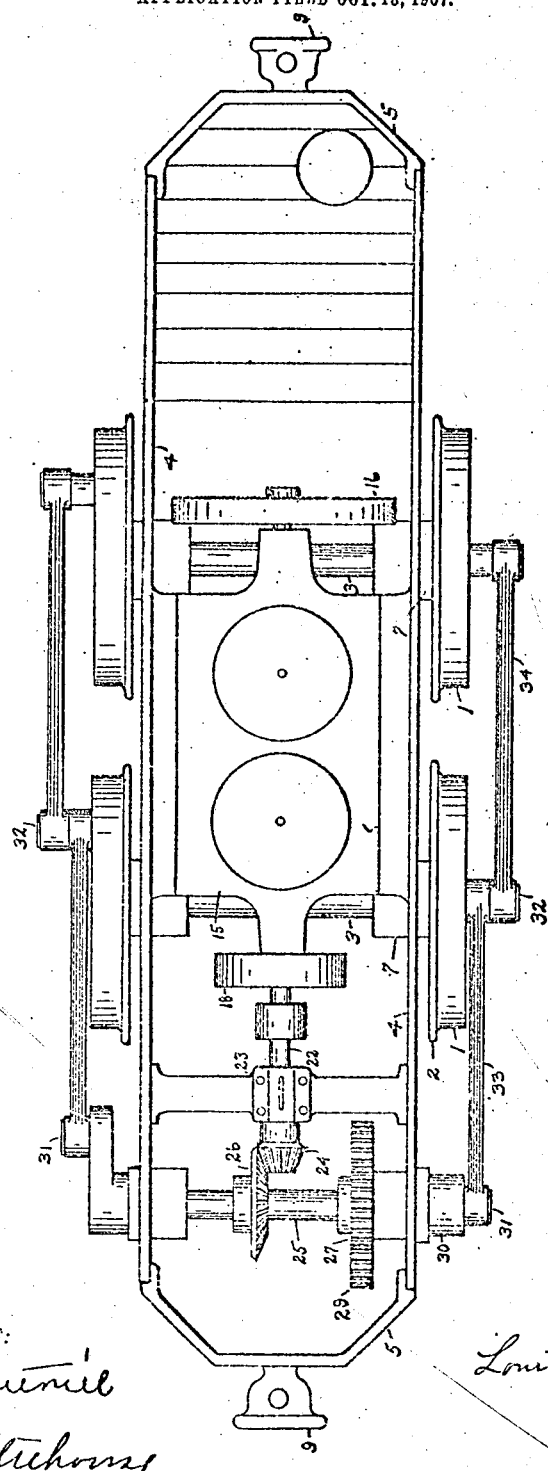

LOUIS J. MONAHAN, OF OSHKOSH, WISCONSIN, ASSIGNOR TO TERMAAT & MONAHAN CO., OF OSHKOSH, WISCONSIN.

LOCOMOTIVE.

No. 895,407.

Specification of Letters Patent.

Patented Aug. 4, 1908.

Application filed October 18, 1907. Serial No. 398,011.

*To all whom it may concern:*

Be it known that I, LOUIS J. MONAHAN, a citizen of the United States, residing at Oshkosh, in the county of Winnebago and State of Wisconsin, have invented certain new and useful Improvements in Locomotives, of which the following is a specification.

The invention relates to a new and useful device or locomotive for hauling cars and lading on rails and has special relation to such as having its power furnished by internal combustion engines.

The object of the invention is the provision and arrangement of mechanical parts to produce a combination of simple and substantial construction to give the maximum of tractive force to the driving wheels.

A further object is to so arrange the parts that only simple and positive driving mechanism are used between the engine and driving wheels, and further to have the entire mechanism and parts above the wheels and axles rest on springs without interfering with the positive driving mechanism.

In the drawings Figure 1 is a side elevation of the outfit and Fig. 2 a plan view.

Four drive wheels 1 are provided having a regular conventional flange 2, two wheels are keyed to axles 3 of suitable length to suit the gage of track on which the machine is to run.

A frame of cast iron is provided comprising a built up arrangement having two side plates 4 and two ends 5, the latter being set between the side plates as shown in Fig. 2 and the four parts securely bolted together making a box like rigid frame. The side plates have openings 6 as shown, the said openings are fitted with suitable half boxes 7 to form journals or bearings which rest on the axles 3, the said boxes are capable of sliding up and down in the openings 6 but rest on the axles at all times. A spring 8 is arranged above the boxes and rests against the side plate at the upper end of the openings 6 so that the weight of the box frame is at all times resting on the axles through the springs 8 and journal boxes 7, therefore the rolling of the wheels will cause the traveling horizontally of the frame and parts connected thereto. The end pieces of the frame 5 have suitable draw bars 9 attached thereto for the purpose of coupling cars or other devices to be hauled. Brake shoes 10 are also provided for retarding or stopping the wheels quickly, the said brake shoes have toggle joint connections 11 as shown with a rod 12 connected to a crank arm 13 on top of the frame, a lever 14 is connected to the cranks 13 to effect the operation of the brakes.

A reversible internal combustion engine 15 having a suitable number of cylinders and preferably of the two cycle type is arranged between the side frames and secured thereto rigidly, a fly wheel for starting is shown at 16 and a sparking timer for speed changing at 17. A friction clutch 18 is secured to the engine shaft with an attached operating lever 19 also an extension 20 to a lever at the operating end 21 so all operating devices are arranged conveniently near the operator. An extending shaft 22 from the friction clutch is journaled in a bearing 23 which is secured to the frame, the shaft 22 has a bevel pinion 24 secured thereto at the end outside the bearing. A cross shaft 25 is journaled in the frame as shown and carries a bevel gear 26 which is meshed with the pinion 24, it will be seen that by the revolving of the shaft 22 the shaft 25 is driven also.

A spur gear 27 is secured to the shaft 25 and adapted to rotate therewith. Another shaft 28 is journaled in the frame below the shaft 25 and approximately in line horizontally with the axles 3 and also parallel therewith. A spur gear 29 is secured to the shaft 28 and adapted to mesh with the other spur gear 27. The shaft 28 is made the same length as the axles 3 and has two crank arms 30, one secured to each end, but arranged at right angles or on a quarter to each other, crank pins 31 are secured therein as shown. Crank pins 32 are secured to the driving wheels 1 with a crank radius or stroke equal to that of the crank arms 30 so that all the crank pins have the same stroke. A link 33 is provided of suitable length with bearings at each end to fit the crank pins 31 and 32 on each side, also another link 34 fitted from the crank pin of one wheel to the other on each side. The crank pins on the driving wheels are arranged on a quarter or at right angles to each other and with the same side "leading" as on the crank arms 30. It will be seen that when the crank arms 30 are revolved the four drive wheels must turn in unison therewith and while one side of cranks are on a dead center the other side is on a quarter therefrom or on the easiest pulling position and vice versa.

In operation, the explosive motor is started in either direction using gasolene, alcohol or kerosene as fuel and speeded up by the timer 17 or by a suitable throttling carbureter, then the clutch 18 engaged by means of the lever 21, this causes the bevel pinion 24 and its meshing gear 26 to rotate which in turn rotates the shaft 25 and spur gear 27, the said spur gear meshing with the larger spur gear 29 causes it to rotate also and in consequence the shaft 28 and crank arms 30, the driving wheels 1 being coupled to the crank arms 30 by the links or side rods 33 and 34 are also caused to revolve exactly in unison and, while one set of cranks on one side are on a dead center, the opposite set are on a quarter allowing of a good and efficient rotary transmission at any point of the revolution. It will be seen that there is a gradual reduction in the speeds from the engine down to the driving shaft or drive wheels, the ratio of speeds being arranged to suit the speed and hauling capacity desired. By reducing the speeds a great leverage is had and consequently greater hauling capacity for a given engine power. The frame and parts are preferably built very heavy to give tractive friction to the wheels. It will also be seen that the whole frame and parts attached thereto are resting on springs which tend to lessen the vibration and with the driving shaft in approximately a horizontal line with the driving axles no detrimental effect is produced by an upward and downward motion on the springs as the rod lengths would not vary enough to cause any binding. The springs are an important element because vibration would be considerable without them.

Having fully described the invention what I claim and desire to secure by Letters Patent is:

1. In a gas driven locomotive the combination with a suitable gas engine or motor, of a supporting frame, having axles and shaft bearings therein, a disengaging clutch attached to the said engine shaft, a bevel gear attached axially with the said clutch, another bevel gear arranged to mesh with the first said gear and mounted on a counter shaft, said shaft being journaled in the said frame and also having a spur gear secured thereon, a crank shaft arranged below the said counter shaft and having a spur gear secured thereon and adapted to mesh with the above said spur gear, crank disks or arms secured to the crank shaft at each end thereof and having crank pins secured therein at right angles to each other, driving wheels and axles journaled in the said frame, crank pins secured to the driving wheels and at right angles to each other, side rods or links adapted to connect the crank shaft with the said driving wheels whereby the wheels and crank shaft revolve in unison.

2. In a gas driven locomotive the combination with a suitable frame having driving wheels and axles journaled therein, an explosive motor mounted in said frame and having the driving shaft extending at right angles to the driving axles, a friction clutch attached to the driving shaft of the said engine and having a shaft extension journaled in the frame, a bevel pinion mounted on the said shaft extension, a counter shaft journaled in the frame parallel to the said axles and having a bevel gear mounted thereon and adapted to mesh with the aforesaid bevel pinion, a crank shaft journaled in the frame, parallel with the said counter shaft and axles, and having cranks attached to each end thereof and adapted to extend outside the frame, spur gears adapted to connect the counter shaft and crank shaft, means for connecting the driving wheels rotatably with the crank shaft through a system of connecting rods whereby the driving wheels, crank shaft and counter shaft revolve in unison.

In testimony whereof I hereunto affix my signature in presence of two witnesses.

LOUIS J. MONAHAN.

Witnesses:
W. W. WATERHOUSE,
ANNE CLEAVLAND.